(12) United States Patent
Greber et al.

(10) Patent No.: US 8,661,792 B2
(45) Date of Patent: Mar. 4, 2014

(54) EXHAUST LINE WITH INJECTION SYSTEM

(75) Inventors: Frederic Greber, Ecot (FR); Yohann Perrot, Belleville-en-Caux (FR); Jean-Paul Brunel, Meslieres (FR)

(73) Assignee: Faurecia Systemes d'Echappement, Nanterre (FR)

( * ) Notice: Subject to any disclaimer, the term of this patent is extended or adjusted under 35 U.S.C. 154(b) by 190 days.

(21) Appl. No.: 13/378,433

(22) PCT Filed: Jun. 8, 2010

(86) PCT No.: PCT/FR2010/051131
§ 371 (c)(1),
(2), (4) Date: Mar. 20, 2012

(87) PCT Pub. No.: WO2010/146285
PCT Pub. Date: Dec. 23, 2010

(65) Prior Publication Data
US 2012/0216513 A1 Aug. 30, 2012

(30) Foreign Application Priority Data

Jun. 19, 2009 (FR) ..................................... 09 54199

(51) Int. Cl.
*F01N 3/00* (2006.01)
(52) U.S. Cl.
USPC .................... 60/295; 60/286; 60/301; 60/303
(58) Field of Classification Search
USPC ............ 60/286, 295, 297, 301, 303, 317, 324
See application file for complete search history.

(56) References Cited

U.S. PATENT DOCUMENTS

| 7,448,206 | B2 * | 11/2008 | Meingast et al. | ............... | 60/286 |
| 7,712,305 | B2 * | 5/2010 | Kapsos et al. | .................. | 60/286 |
| 8,033,104 | B2 * | 10/2011 | Zhang | ............. | 60/295 |
| 8,240,135 | B2 * | 8/2012 | Zhang | ............. | 60/288 |
| 8,539,761 | B2 * | 9/2013 | Lebas et al. | ..................... | 60/324 |
| 2009/0019842 | A1 | 1/2009 | Suzuki | | |

FOREIGN PATENT DOCUMENTS

| EP | 1982756 A1 | 10/2008 |
| EP | 2019190 A1 | 1/2009 |
| WO | 2008/111254 A1 | 9/2008 |
| WO | 2008/115841 A1 | 9/2008 |
| WO | 2008/144385 A2 | 11/2008 |

OTHER PUBLICATIONS

International Search Report dated Oct. 4, 2010.

* cited by examiner

*Primary Examiner* — Binh Q Tran
(74) *Attorney, Agent, or Firm* — Carlson, Gaskey & Olds, PC

(57) ABSTRACT

An exhaust line has upstream and downstream blocks for processing exhaust gases. An injection section is arranged between an upstream face defined by the upstream block and a downstream face defined by the downstream block and includes a circulation channel for the exhaust gas flow extending from the upstream face to the downstream face. The channel includes a central line having a determined length between the upstream and downstream faces. The injection section includes a reagent injector capable of injecting a reagent into the injection section. The injection section has a first cup inside the circulation channel in the flow path such that the average path of exhaust gas jets is higher by at least 20% in relation to the predetermined length. A second cup is arranged inside the circulation channel between the upstream face and the first cup. The reagent is done between the first cup and the second cup.

19 Claims, 11 Drawing Sheets

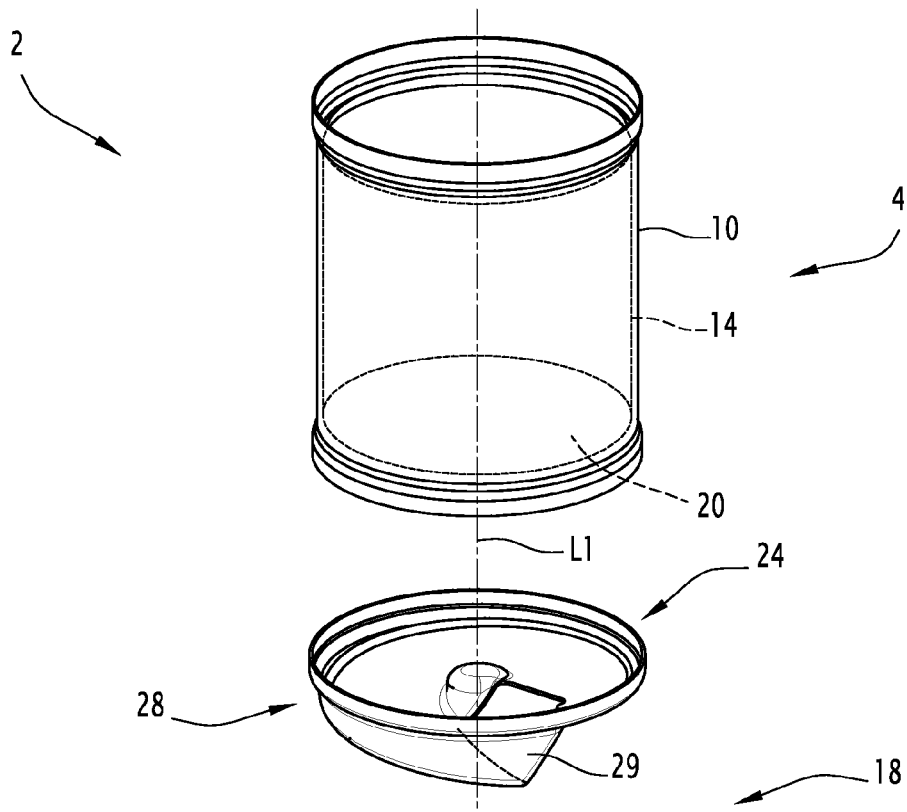
FIG.1
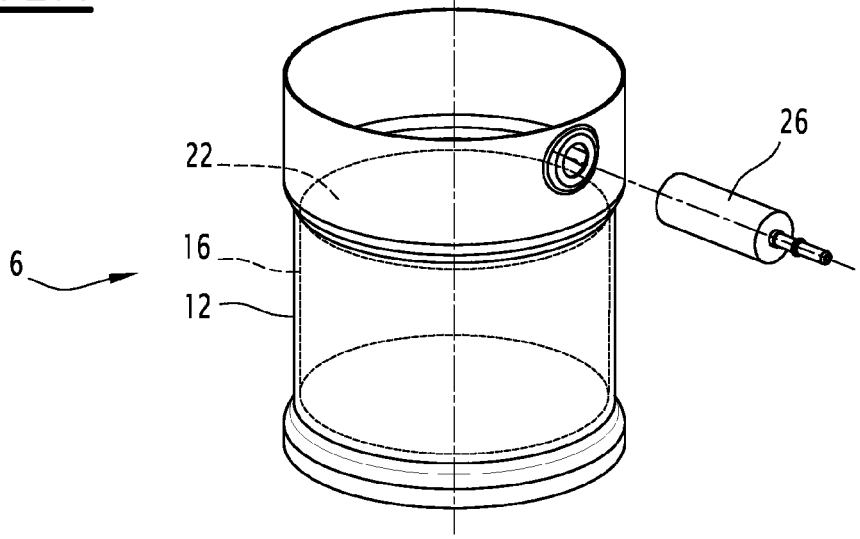

EXHAUST LINE WITH INJECTION SYSTEM

RELATED APPLICATION

This application is the U.S. national phase of PCT/FR2010/051131, filed Jun. 8, 2010, claiming priority to FR 09 5199, filed Jun. 19, 2009.

TECHNICAL FIELD

The present invention generally relates to exhaust lines for automobiles equipped with reducing agent injection devices for a selective reduction catalyst of the exhaust gases of an engine.

An automobile exhaust line, of the type comprises upstream and downstream blocks for processing exhaust gases flowing in an exhaust line. The upstream and downstream blocks are arranged in series in the exhaust line. An injection section is arranged between an upstream face defined by the upstream block and a downstream face defined by the downstream block. A circulation channel for the exhaust gas flow extends from the upstream face to the downstream face. The channel includes a central line having a determined length between the upstream and downstream faces. The injection section includes a reagent injector mounted on the injection section that is capable of injecting a reagent into the injection section.

BACKGROUND OF THE INVENTION

Such an exhaust line is provided to equip an internal combustion engine, for example a Diesel. It includes a system for reducing the nitrogen oxides and an injector for a reducing agent, such as urea, placed upstream of said system. The most widespread configuration of the urea injection zones is generally situated between a particle filter (preceded by an oxidation catalyst) upstream and a selective catalytic reduction (SCR) of the nitrogen oxides downstream. Another fairly widespread solution consists of placing the injection zone between the oxidation catalyst and either an impregnated particle filter to treat the nitrogen oxide reduction, or an SCR catalyst followed by a traditional particle filter.

However, in both cases, the current injection zones comprise, from the outlet face of the upstream block (which is either a particle filter or an oxidation catalyst) as far as the inlet face of the following block (which is either an SCR catalyst, or an SCR impregnated particle filter or an SCR catalyst followed by a standard particle filter): a convergent cone that reduces the gas passage diameter, a tube supporting the injector, and a divergent inlet cone that increases the gas passage diameter. Furthermore, in most cases, the injection zones comprise a mixer inside the tube after the support for the injector.

Such an arrangement imposes an incompressible link, in particular due to the presence of the convergent and divergent cones. Furthermore, to ensure correct operation of a urea injection system, it is necessary for the injection, evaporation, hydrolysis-thermolysis of the urea into ammonia, and mixing of the ammonia with the exhaust gas functions to be ensured so as to obtain a very homogenous dispersion of the ammonia in the exhaust gases on the intake face of the downstream block. This conversion of the urea into ammonia and the mixture between the ammonia and the exhaust gases require time, and therefore a significant path distance.

In all, by optimizing the different functions as much as possible, the distance between the two blocks can be reduced to 200 mm. Nevertheless, such an arrangement with a reduced distance is delicate and costly to produce.

In this context, the invention aims to propose an exhaust line having a more satisfactory operation, a reduced bulk, and a lower production cost.

SUMMARY OF THE INVENTION

An automobile exhaust line, of the type comprises upstream and downstream blocks for processing exhaust gases flowing in an exhaust line. The upstream and downstream blocks are arranged in series in the exhaust line. An injection section is arranged between an upstream face defined by the upstream block and a downstream face defined by the downstream block. A circulation channel for the exhaust gas flow extends from the upstream face to the downstream face. The channel includes a central line having a determined length between the upstream and downstream faces. The injection section includes a reagent injector mounted on the injection section that is capable of injecting a reagent into the injection section.

The injection section comprises at least a first cup arranged inside the circulation channel in the path of the exhaust gas flow such that an average path of exhaust gas jets is higher by at least 20% in relation to the predetermined length.

The exhaust line may include one or more of the following features, considered alone or according to all technically possible combinations:

- the determined length is substantially comprised between 40 and 140 mm;
- the bottom of the first cup winds in a spiral around the central line of the injection section;
- the bottom of the first cup winds in a spiral around the central line of the injection section, performing three quarters of a revolution;
- the first cup has an opening at the end of the spiral furthest from the upstream face;
- the first cup has a spoiler at the end of the spiral furthest from the upstream face;
- the spoiler extends the bottom of the first cup toward the upstream face and toward the outside of the spiral;
- the injection section includes a second cup arranged inside the circulation channel between the upstream face and the first cup, the second cup having a bottom wound in a spiral around the central line of the injection section;
- the second cup has an opening at the end of the spiral furthest from the upstream face;
- the second cup has an opening at the end of the spiral closest to the upstream face;
- the two cups define a spiral-shaped conduit between them, starting from the opening of the second cup and going to the opening of the first cup, extending over at least 180°, preferably 275°, and having a straight section substantially greater than 2300 $mm^2$;
- the first cup includes a rounded wall having the central zone protruding toward the upstream face and a hollow peripheral zone facing the upstream face surrounding the protruding central zone, an opening being formed in the wall of the first cup between the protruding central zone and the hollow peripheral zone;
- the injection section includes a second cup arranged inside the circulation channel between the upstream face and the first cup, the second cup comprising a rounded wall having a hollow central zone facing the upstream face and a peripheral zone protruding toward the upstream face surrounding the hollow central zone, an opening being formed in the wall of the second cup between the hollow central zone and the protruding peripheral zone;

the first and second cups are shaped to impart a helical movement to the exhaust gases from the opening of the second cup to the opening of the first cup;

the reagent is injected between the first cup and the second cup;

the opening of the first cup and the opening of the second cup are angularly offset relative to one another around the central line;

the cup has perforations with a diameter substantially equal to 5 mm or an opening;

the first cup comprises a wire mesh layer over at least part of its surface;

the reagent injector is oriented so that the injection direction is perpendicular to the injection section; and the reagent injector is oriented so that the injection direction is parallel to the tangent to the injection section.

BRIEF DESCRIPTION OF THE DRAWINGS

Other features and advantages of the invention will emerge from the following detailed description thereof, provided for information and non-limitingly, in reference to the appended figures, in which:

FIG. 1 is an exploded perspective view of the exhaust line according to one embodiment of the invention.

DETAILED DESCRIPTION

Figure 2:
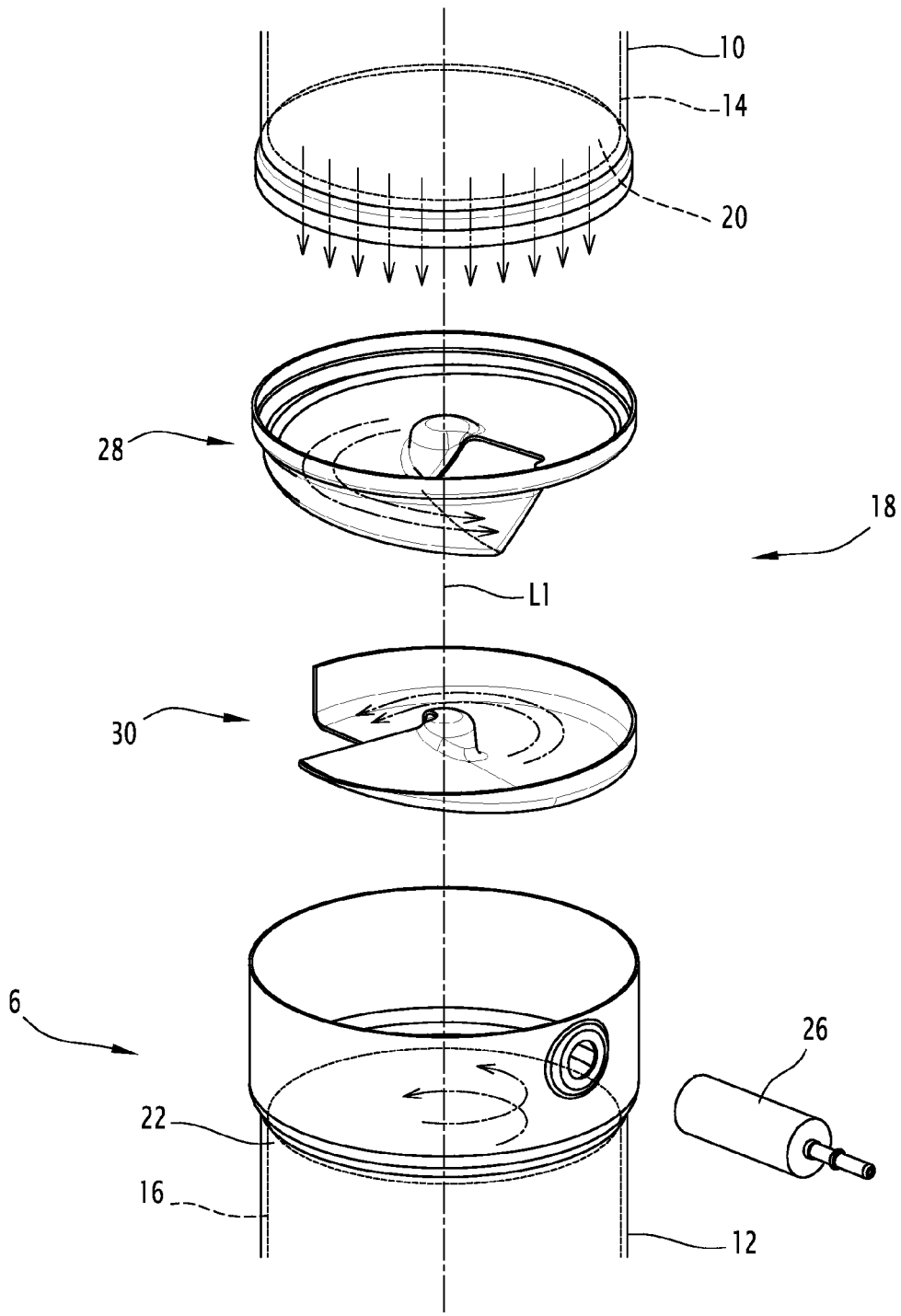
FIG. 2 is an exploded perspective view of the exhaust line of FIG. 1 illustrating the operation thereof.

In the following description, upstream and downstream will be understood relative to the normal circulation direction of the exhaust gases through the exhaust line, indicated by the arrows in the figures.

The exhaust line 2 shown partially in FIG. 1 is provided to be mounted on an automobile equipped with an internal combustion engine, for example a Diesel. The exhaust line 2 includes two exhaust gas processing devices 4, 6. Each exhaust gas processing device 4, 6 comprises an outer enclosure 10, 12 and a block 14, 16 arranged inside the enclosure 10, 12.

For example, the upstream exhaust gas processing device 14 is a particle filter or an oxidation catalyst and the downstream exhaust gas processing device 16 is an SCR catalyst, or an SCR impregnated particle filter or an SCR catalyst followed by a standard particle filter.

The block of an oxidation catalyst or SCR, for example, comprises a gas-permeable structure covered with catalytic metals favoring the oxidation of the combustion gases and/or the reduction of the nitrogen oxides. The block of a particle filter is adapted to retain the soot particles given out by the engine and possibly to bind the gaseous pollutants.

The exhaust line 2 also comprises an injection section 18 arranged between an upstream face 20 defined by the upstream block 14 and a downstream face 22 defined by the downstream block 16. The upstream face 20 is the face through which the exhaust gases leave the upstream block 14 and the downstream face 22 is the face through which the exhaust gases enter the downstream block 16.

The injection section 18 includes a circulation channel 24 for the exhaust gas flow extending from the upstream face 20 to the downstream face 22 and a reagent injector 26 mounted on the injection section 18 and capable of injecting a reagent into the injection section 18.

The channel 24 has a central line L1 having a determined length between the upstream 20 and downstream 22 faces. The central line L1 is the line passing through the geometric centers of the straight sections of the circulation channel 24. In the illustrated example, this is the straight line parallel to the axis of the upstream and downstream blocks. It is perpendicular to the upstream 20 and downstream 22 faces and passes through their centers.

The injection section 18 includes a cup 28 arranged inside the circulation channel 24 in the path of the exhaust gas flow. This cup 28 is called a weir. The bottom of the weir 28 winds in a spiral around the central line of the injection section and has a large opening 29 at the end of the spiral furthest from the upstream face. The opening 29 is inclined both relative to the central line L1 and relative to a plane perpendicular to the central line L1.

The diameter of the cup 28 is equal to the inner diameter of the exhaust gas circulation channel. It extends in the entire straight section of the circulation channel 24. The peripheral edge of the cup 28 bears against the inner surface of the circulation channel.

The spiral shape of the weir 28 initiates the rotary movement of the exhaust gases, the only loophole being downstream. The exhaust gases perform approximately one complete revolution.

The uppermost part of the weir 28 is approximately 6 mm from the outlet face 20 of the upstream block. According to one alternative, this distance may be increased up to 10 mm so as not to excessively increase the back pressure.

Furthermore, the injection section 18 includes a second cup 30, called a "channel," arranged inside the circulation channel 24 between the first cup 28 and the downstream face 22. The second cup 30 has a bottom winding in a spiral around the central line L1 of the injection section.

Preferably, the bottom of the second cup 30 winds in a spiral around the central line of the injection section performing three quarters of a revolution.

The second cup 30 has an opening at the end of the spiral furthest from the upstream face. This opening is limited by the two extreme edges of the spiral-shaped bottom of the second cup 30 and the wall of the circulation conduit 24.

The diameter of the second cup 30 is equal to the inner diameter of the exhaust gas circulation channel. It extends in the entire straight section of the circulation channel 24, with the peripheral edge of the cup 30 bearing against the inner surface of the circulation channel.

The two cups 28, 30 define a spiral-shaped conduit between them, going from the opening 29 of the weir 28 to the opening of the cup 30 and extending over at least 180°, preferably 275°. This spiral-shaped conduit is laterally limited by the inner surface of the circulation channel 24.

The spiral-shaped conduit in the openings of the cups offers the exhaust gases a section substantially larger than 2300 mm$^2$ and preferably at least 2375 mm$^2$. This section corresponds to the section of a tube with a 55 mm diameter, commonly used in exhaust lines and in particular in the injection zone.

The opening of the first cup 28 and the opening of the second cup 30 are angularly offset relative to one another around the central line L1, so as to prevent any direct path parallel to the central line L1 of the injection section of the exhaust gas flow.

The injection section has a cylindrical side wall with a diameter of approximately 150 mm, i.e. substantially equal to the diameters of the gas processing devices, and a length comprised between 40 and 140 mm. Preferably, the distance between the upstream face of the upstream block and the downstream face of the downstream block is comprised between 60 and 100 mm.

The side wall is made in a single piece with the outer enclosure 12 surrounding the downstream block 16.

The two cups are fixed to the side wall by welds, for example.

The side wall comprises an orifice intended to introduce and fix the injector for the reagent, here urea, to the wall between the first cup 28 and the second cup 30. The injector is oriented so that the injection direction is perpendicular to said side wall.

According to one alternative, the injector is oriented such that the injection direction has an angle comprised between 40° and 45° relative to the tangent to the side wall to make the jet concurrent with the exhaust gas.

Figure 3:
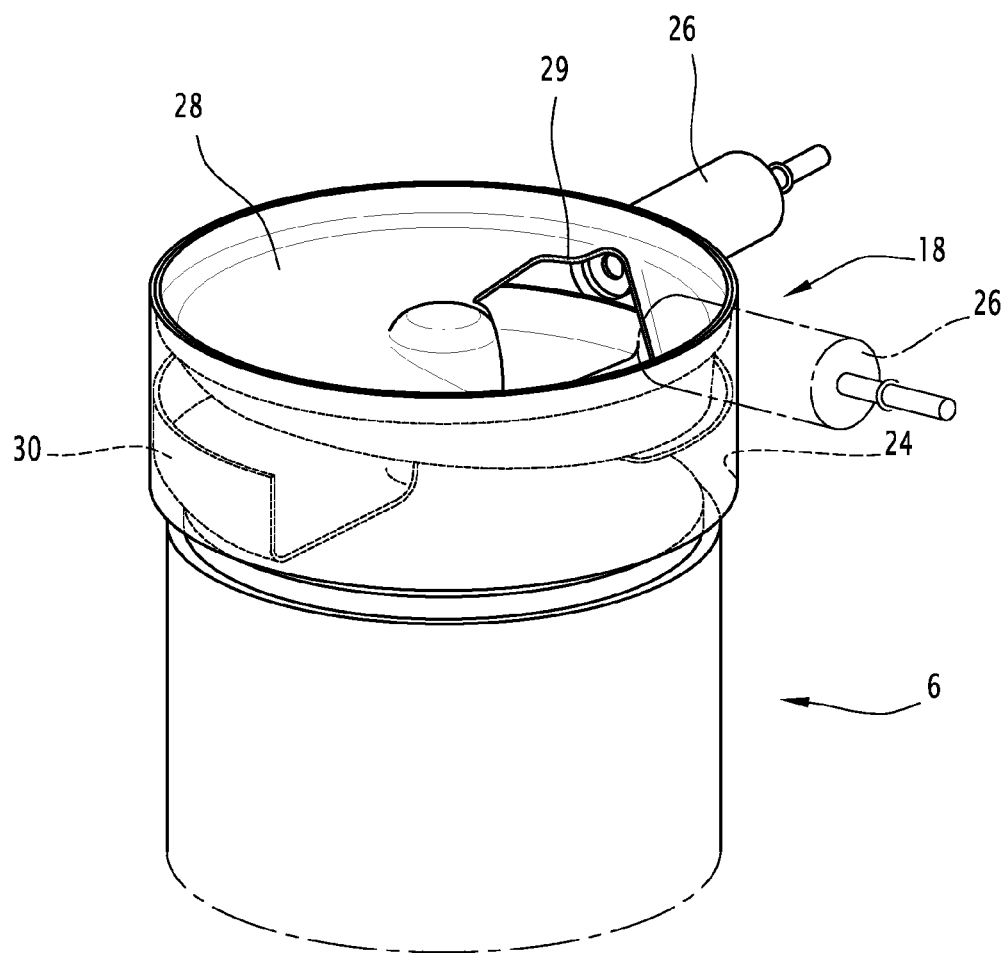
FIG. 3 is a compact perspective view of the exhaust line of FIG. 1.

According to another alternative illustrated in broken lines in FIG. 3, the injector 26 is oriented so that the injection direction is parallel to the tangent to the side wall, thereby making it possible to obtain a more compact injection section 18.

According to another alternative, the first cup 28 comprises a local deflector to prevent contact between the jet of urea droplets and the upstream block 14. For example, the local deflector is formed by cutting out the first cup.

The operation of the exhaust line described above will now be explained in detail, in light of FIG. 2, in which exhaust gas jets are illustrated.

After having passed through the upstream block 14, the exhaust gases leave the upstream block 14 with a substantially uniform distribution. The exhaust gas flow is laminar and substantially parallel to the central line L1. The exhaust gases arrive on the first cup 28. The circulation of the gases parallel to the central line L1 is blocked by the first cup 28, the spiral shape of which initiates the rotary movement of the gases.

The gases then enter the channel 30, the spiral shape of which maintains the rotary movement of the exhaust gases.

At the outlet of the first cup 28 or weir, the urea is injected in the upstream portion of the channel 30. The conversion of the urea into ammonia takes place during the passage of the gases in the channel 30, i.e. during the time necessary for the gas to perform the three-quarters revolution. The average distance traveled by the exhaust gases during this three-quarters revolution is approximately 180 mm. This distance corresponds to the distance necessary to convert the urea into ammonia if one uses an injector having a jet characterized by a mean diameter (SMD) of 90 μm, an injection speed of 25 ms, and a dispersion angle of 16°.

Once the gases have reached the opening or outlet of the channel 30, they pass through the downstream block 16.

The gases having reached this stage have already on average performed a little more than one revolution; they have therefore acquired a significant tangential speed and "attack" the downstream face 22 or inlet face of the following block 16 with that component. It is known that reaching a block in this manner favors the obtainment of a good, uniform distribution on the surface of said block.

The injection section 18 typically has a length of only 60 mm and a diameter of 150 mm, i.e. the diameter of the outer enclosures surrounding the upstream and downstream blocks. In this way, as shown in FIG. 3, the injection section is contained in a cylinder of 60 mm×150 mm in diameter and makes it possible to increase the average path of the exhaust gas jets by at least 20% relative to the determined length between the upstream face 20 and the downstream face 22.

Furthermore, if the gas flow rate is different from the aforementioned example, then the length of the cylinder will be different to form a necessary passage section. If this flow rate is higher, then the distance between the two blocks must be increased. If it is lower, then it may be decreased.

This embodiment can be used in a horizontal or vertical portion, under the floor or under the end casing (in the close position) of an automobile.

This system of course operates with all types of urea injectors, but the characteristics of these different injectors of course have a wide range of jets. These jets have wide or narrow columns, with variable mean diameters for very fine drops or fairly large ones, and more or less significant ejection speeds.

Figure 4:
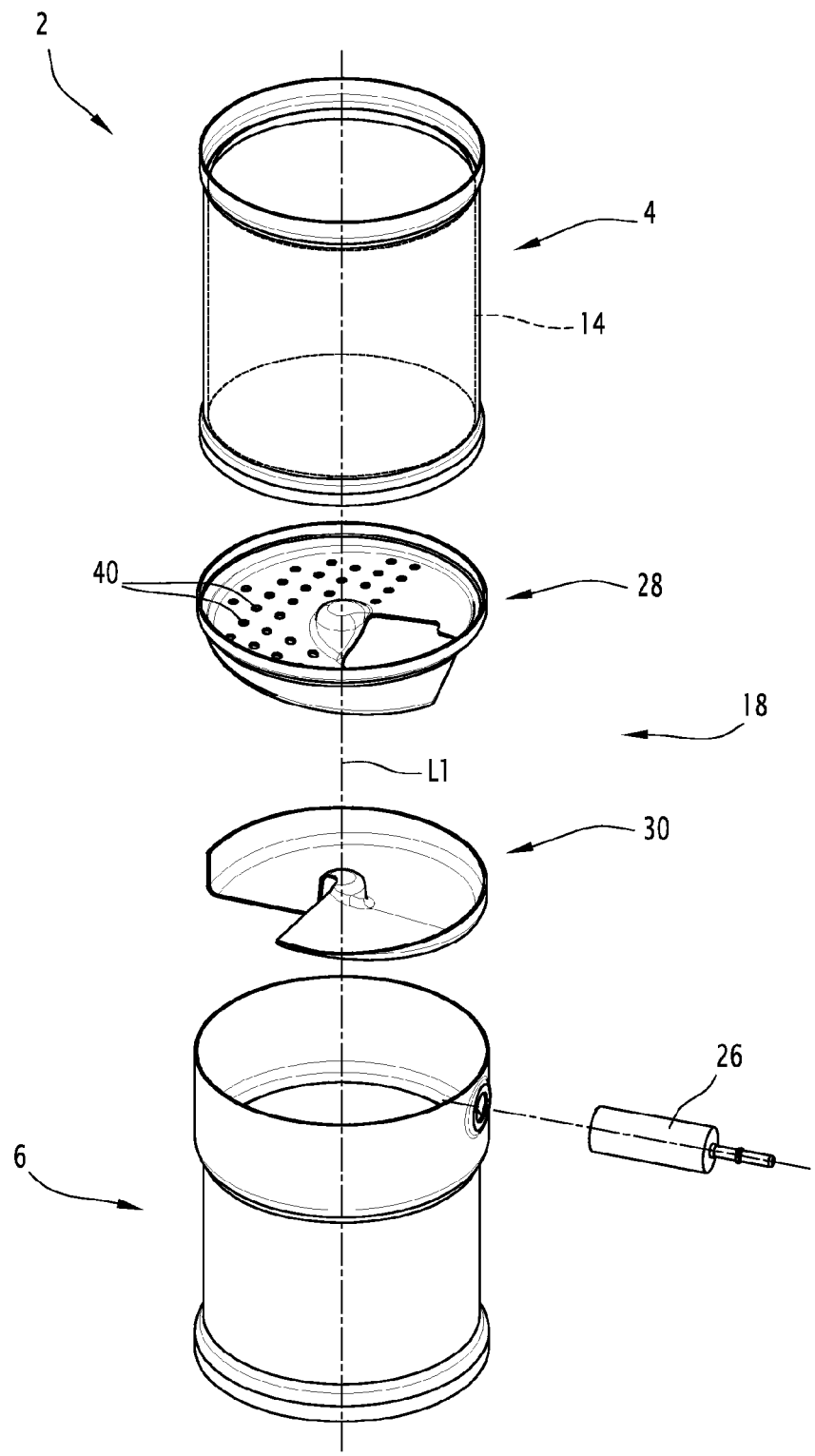
FIG. 4 is a view of the exhaust line of FIG. 1 provided with a device for homogenizing the gas/urea mixture.

Consequently, to ensure optimal homogenization, as shown in FIG. 4, the first cup 28 has perforations 40 with a diameter substantially equal to 5 mm.

For example, if the injector 26 has a jet having little energy and fine droplets, then the urea droplets will not penetrate the gas jets deeply. The urea concentration on the outer edge of the channel 30 will therefore be greater than in the center. The presence of perforations 40 of the weir 28 above the outer edge of the channel 30 will allow the gas leaving the upstream block 14 to short-circuit the inlet of the channel 30 and deplete the urea/air ratio at the periphery of the channel 30.

Conversely, if the characteristics of the injector 26 are such that a large part of the urea is located inside, in the central portion, of the channel 30, the perforations 40 will overhang that zone.

Figure 5:
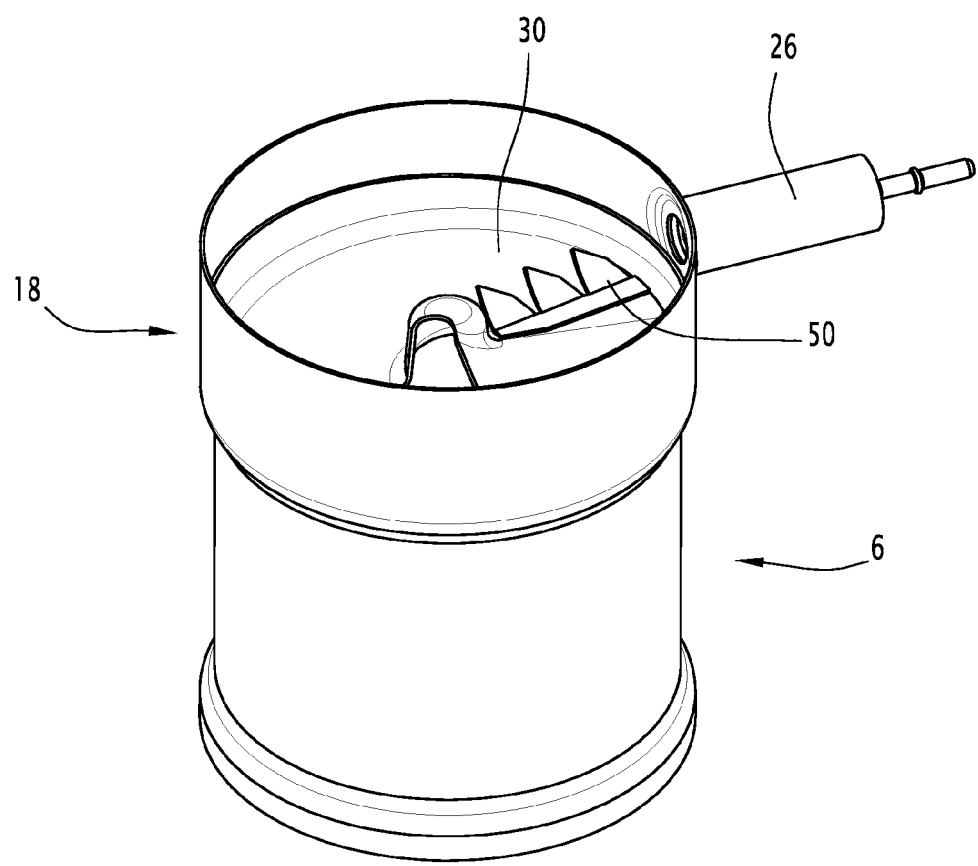
FIG. 5 is another view of the exhaust line of FIG. 1 provided with a device for homogenizing the gas/urea mixture.
Figure 6:
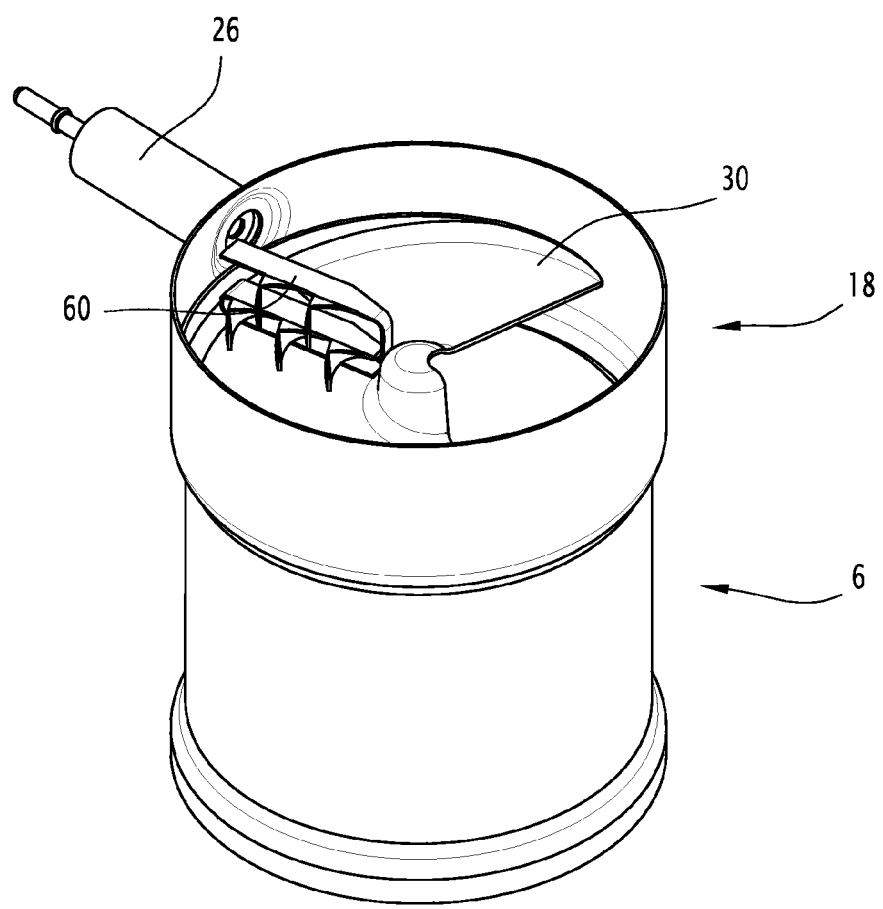
FIG. 6 is another view of the exhaust line of FIG. 1 provided with a device for homogenizing the gas/urea mixture.

According to one alternative illustrated in FIGS. 5 and 6, the injection section 18 comprises a linear mixer situated between the two cups to create obstacles that aim to disrupt the flow so as to homogenize the exhaust gases and the urea or ammonia. This mixer may take the form of fins 50 or tabs fixed on the second cup 30 and oriented toward the first cup 28 (not shown here) as illustrated in FIG. 5 or a helical shape 60 as in FIG. 6.

Figure 7:
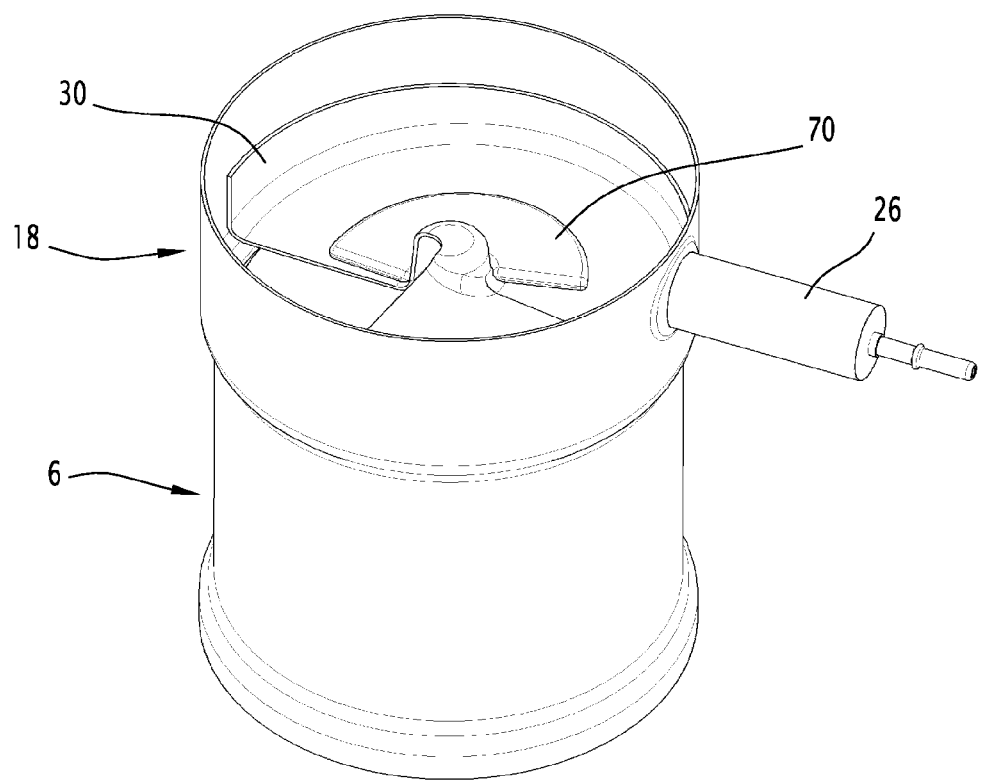
FIG. 7 is another view of the exhaust line of FIG. 1 provided with a device for homogenizing the gas/urea mixture.

According to another alternative shown in FIG. 7, the second cup 30 includes a wire mesh layer 70 arranged on at least part of the surface of the second cup 30. Arranging the second cup 30 independently of the other parts making up the injection section 18 before assembly makes it possible to place a wire mesh layer 70 in the locations where optimization of the evaporation and conversion of the urea into ammonia is necessary. In fact, it is very difficult to place a wire mesh layer 70 in an exhaust tube. In a known manner, adding a wire mesh layer 70 makes it possible to increase the contact surface between the urea and the exhaust gases by significantly increasing the metal/gas exchange surface.

In FIG. 7, the part of the channel 30 covered by the wire mesh 70 is hotter than an outer wall; consequently, the evaporation and conversion of the urea into ammonia will be easier and quicker there.

It is also possible to fix a wire mesh layer 70 on the lower part of the first cup 28 (not shown here) opposite the second cup 30.

The injection section 18 can of course comprise one or more of these alternatives intended to obtain optimal homogenization of the gas/ammonia mixture, considered individually or according to all technically possible combinations.

Figure 8:
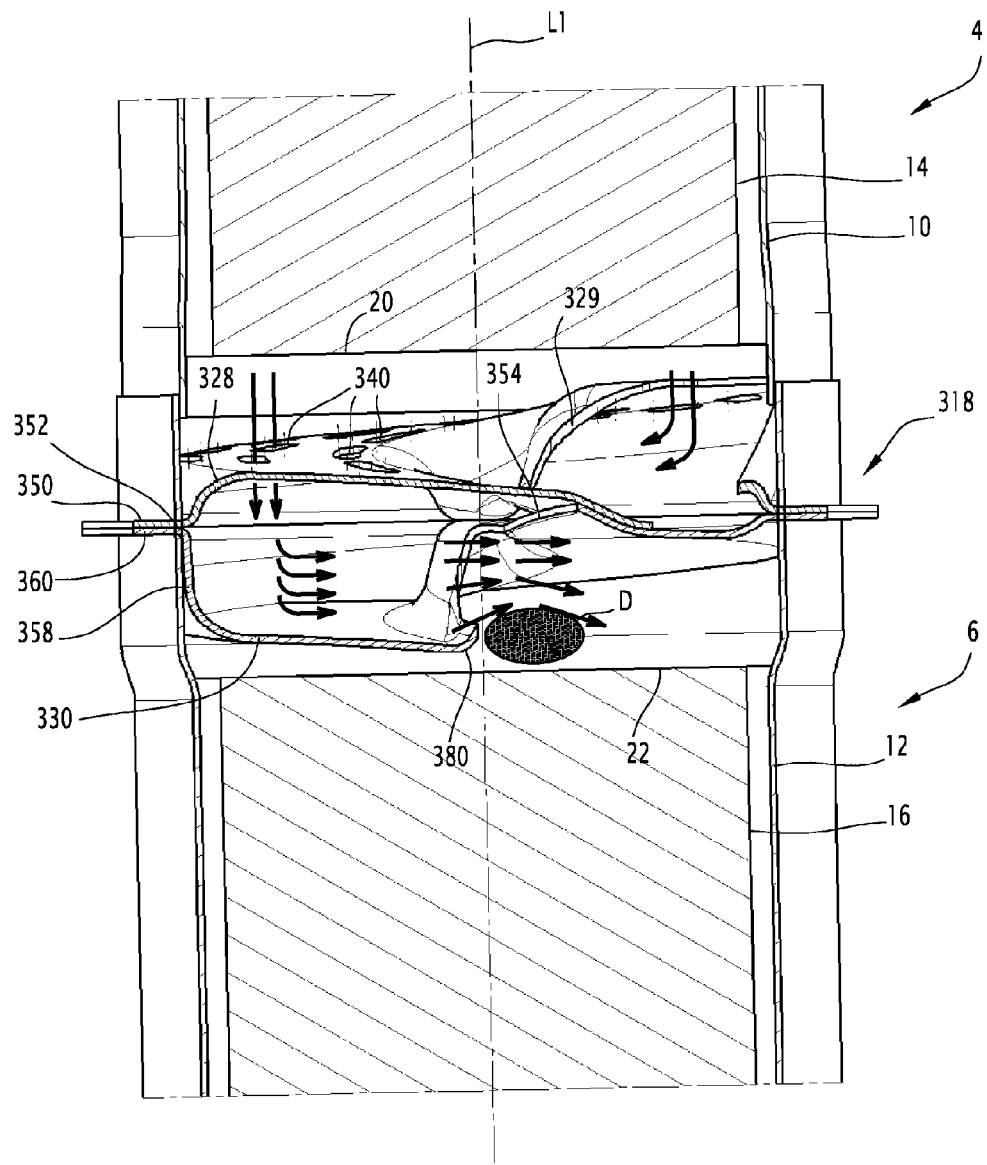
FIG. 8 is a profile view of the second embodiment of the exhaust line according to the invention.
Figure 9:
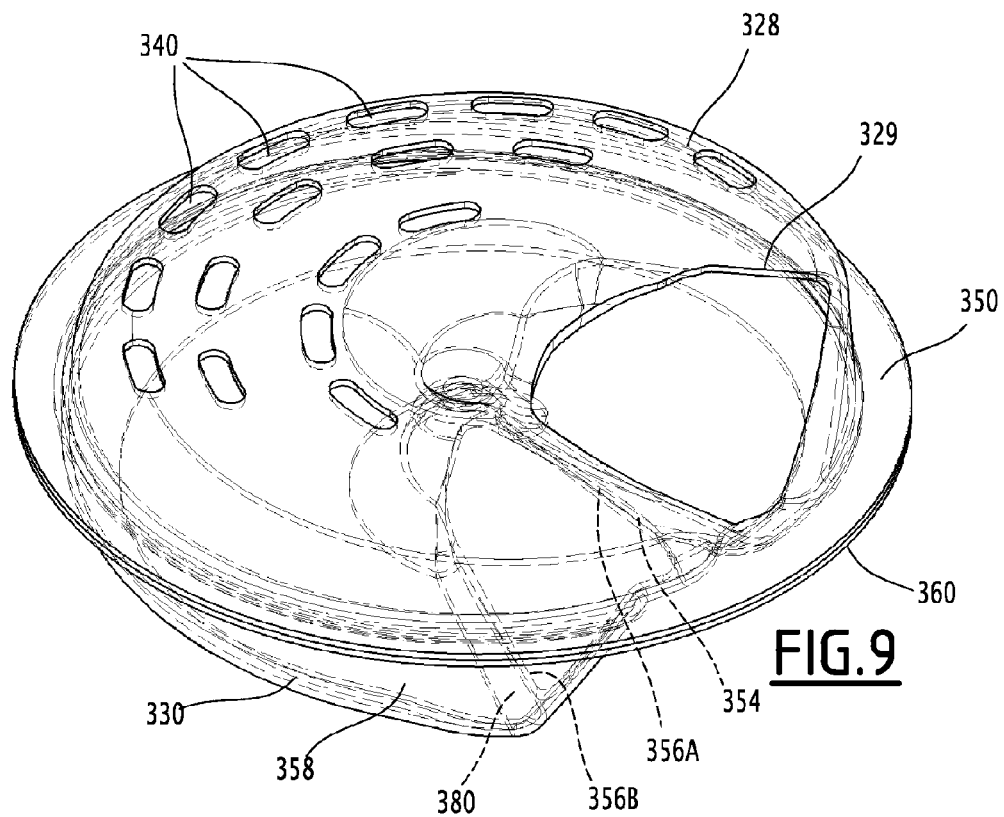
FIG. 9 is a perspective view of the cups of the second embodiment of the exhaust line of FIG. 8.
Figure 10:
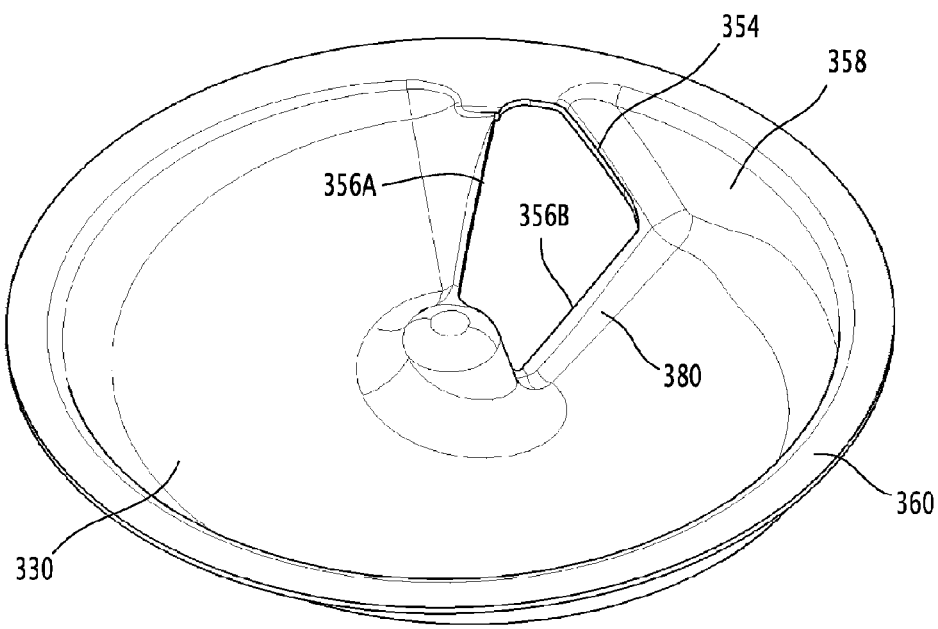
FIG. 10 is a perspective view of one of the cups of the second embodiment of the exhaust line of FIG. 8.

A second embodiment of the injection section 318 is illustrated in FIGS. 8 (profile view), 9 and 10 (perspective views). The injection section 318 comprises a first cup 328 and a second cup 330.

The outer enclosure 12 of the downstream exhaust gas processing device 6 is sealably fixed to the exhaust gases at the lower portion of the outer enclosure 10 of the upstream exhaust gas processing device 4. The downstream block 16 and the two cups 328, 330 are inside the downstream outer enclosure 12.

The first cup 328 has a bottom winding in a spiral around the central line L1 of the injection section 318. The first cup 328 has a concavity facing the downstream face 22, such that the bottom of the first cup 328 forms a lid of the second cup 330.

The first cup 328 has a large opening 329 at the end of the spiral closest to the upstream face 20. The opening 329 is inclined both relative to the central line L1 and relative to a plane perpendicular to the central line L1.

The first cup 328 has a peripheral rim 350 extending the bottom of the first cup 328 and extending substantially perpendicular to the central line L1, the peripheral rim 350 passing through a peripheral lumen 352 formed in the upstream part of the downstream outer enclosure 12. The peripheral rim 350 of the first cup 328 is sealably fixed to the exhaust gases at the downstream outer enclosure 12, for example by welding.

The bottom of the first cup 328 also includes perforations 340 making it possible to ensure optimal homogenization of the exhaust gases.

The second cup 330 is arranged between the first cup 328 and the downstream face 22, the second cup 330 having a bottom winding in a spiral around the central line L1 of the injection section 318.

Preferably, the bottom of the second cup 330 winds in a spiral around the central line L1 of the injection section 318, performing at least three quarters of a revolution.

The second cup 330 has an opening 354 at the end of the spiral furthest from the upstream face 20. This opening 354 is limited by the two end edges 356A, 356B of the spiral-shaped bottom of the second cup 330 and by the peripheral wall 358 of the second cup 330. The peripheral wall 358 of the second cup 330 bears against the inner surface of the circulation channel.

The second cup 330 has a peripheral rim 360 extending the peripheral wall 358 of the second cup 330 and extending substantially perpendicular to the central line L1. The peripheral rim 360 passes through the peripheral lumen 352 formed in the upstream part of the downstream outer enclosure 12. The peripheral rim 360 of the second cup 330 is sealably fixed to the exhaust gases at the downstream outer enclosure 12, for example by welding.

The peripheral rims 350, 360 of the first and second cups 328, 330 are thus arranged opposite and in contact with one another and are fixed to one another sealably to the exhaust gases, for example by welding.

The two cups 328, 330 define a spiral-shaped conduit between them, going from the opening 329 of the first cup 328 to the opening 354 of the second cup 330 and extending over at least 180°, preferably over at least 275°.

The second cup 330 also includes a spoiler 380 arranged at its downstream end, i.e. the end of the spiral furthest from the upstream face 20. The spoiler 380 extends the bottom of the second cup 330 toward the upstream face 20 and toward the outside of the spiral-shaped conduit, and is delimited by the end edge 356B. The spoiler 380 thus forms a convex slot opening toward the upstream face 20.

As an example, the spoiler 380 has a curve radius of 5.5 mm and a height of 7 mm, the height of the spoiler 380 being able to be increased up to 10 mm. The spoiler 380 extends angularly over 10°, this value being able to be increased up to 90°.

The spoiler 380 makes it possible to limit the ammonia concentration just after the opening 354, as will be explained in more detail later The reagent injector (not shown) is provided to inject into the spiral-shaped conduit delimited by the two cups 328, 330. To that end, it is fixed on the bottom of the first cup 328, near the opening 329.

According to one alternative, the injector is fixed on the peripheral wall 358 of the second cup 330.

The operation of the exhaust line according to the second embodiment described above will now be explained in detail, in light of FIG. 8 in which the exhaust gas flow is shown by arrows.

As before, the exhaust gases arrive on the first cup 328. The gases are collected by the first cup 328 after having passed through the upstream block 14.

The exhaust gases then penetrate the spiral-shaped conduit through the opening 329 or through the perforations 340 and circulate in the spiral-shaped conduit up to the opening 354.

At the inlet of the spiral-shaped conduit, the urea is injected and is converted into ammonia during the passage of the exhaust gases in the spiral-shaped conduit.

At the outlet of the spiral-shaped conduit, the spoiler 380 forces the lower layer of exhaust gas, i.e. the layer of gas close to the second cup 330 and highly charged with ammonia, to abruptly change direction to be oriented upward, i.e. toward the upstream face 20, and to mix with the layer of gas situated just above it, this middle layer being less charged with ammonia. The exhaust gases at the outlet of the second cup 330 then have an average and homogenous ammonia concentration.

Furthermore, the sudden deviation of the lower layer of gas by the spoilers 380 creates a vacuum just at the outlet of the second cup 330, in the zone referenced D in FIG. 8. This vacuum suctions the exhaust gases situated between the outlet of the second cup 330 and the downstream block 16, allowing better rotation of the exhaust gases on the downstream face 22.

As an example, in the case of an injection section 318 with a 150 mm diameter and 70 mm length, the uniformity index of the ammonia on the downstream face 22 is increased by 5 to 9 hundredths.

Furthermore, in the same way as in the preceding cases, a mixer may be integrated inside a spiral-shaped conduit and/or part of the walls of the spiral-shaped conduit may include a wire mesh so as to ensure optimal homogenization of the gases and the urea and/or ammonia.

The advantage of this embodiment is that the distribution of the ammonia on the downstream face 22 of the downstream block 16 is improved, the ammonia thus being uniformly distributed in the downstream block 16.

Figure 11:
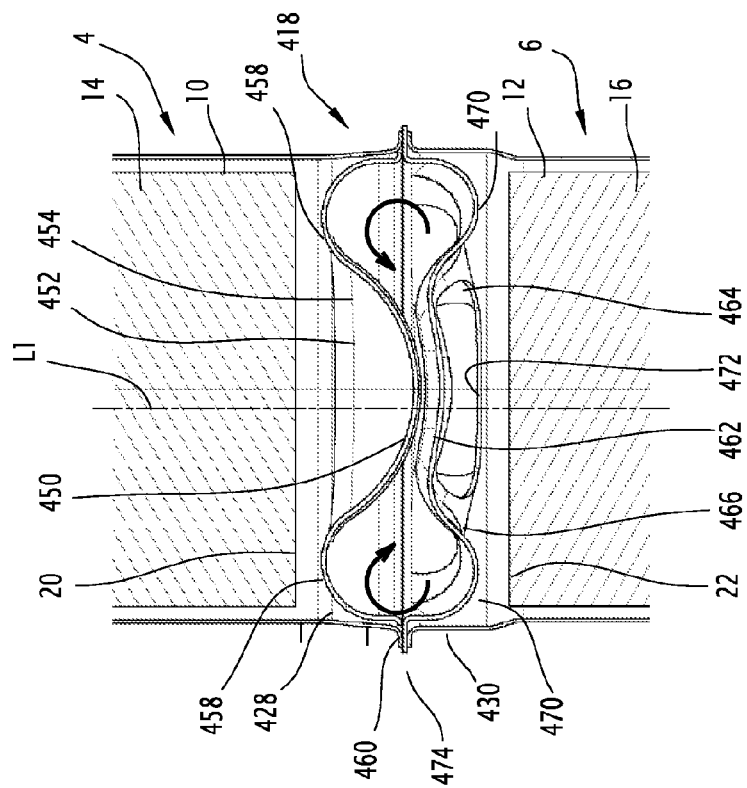
FIG. 11 is a profile view of a third embodiment of the exhaust line according to the invention.
Figure 12:
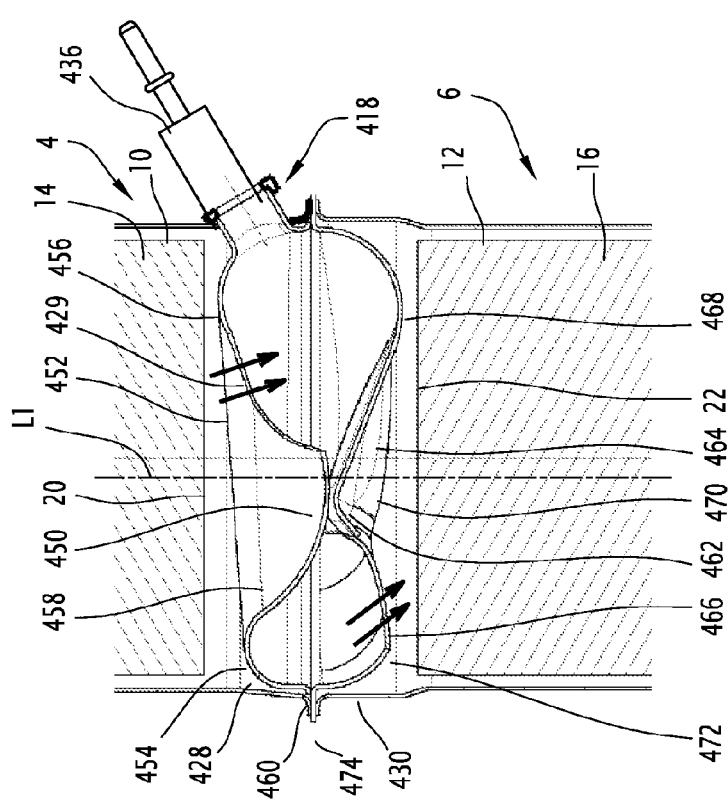
FIG. 12 is another profile view of the third embodiment of the exhaust line of FIG. 11.
Figure 13:
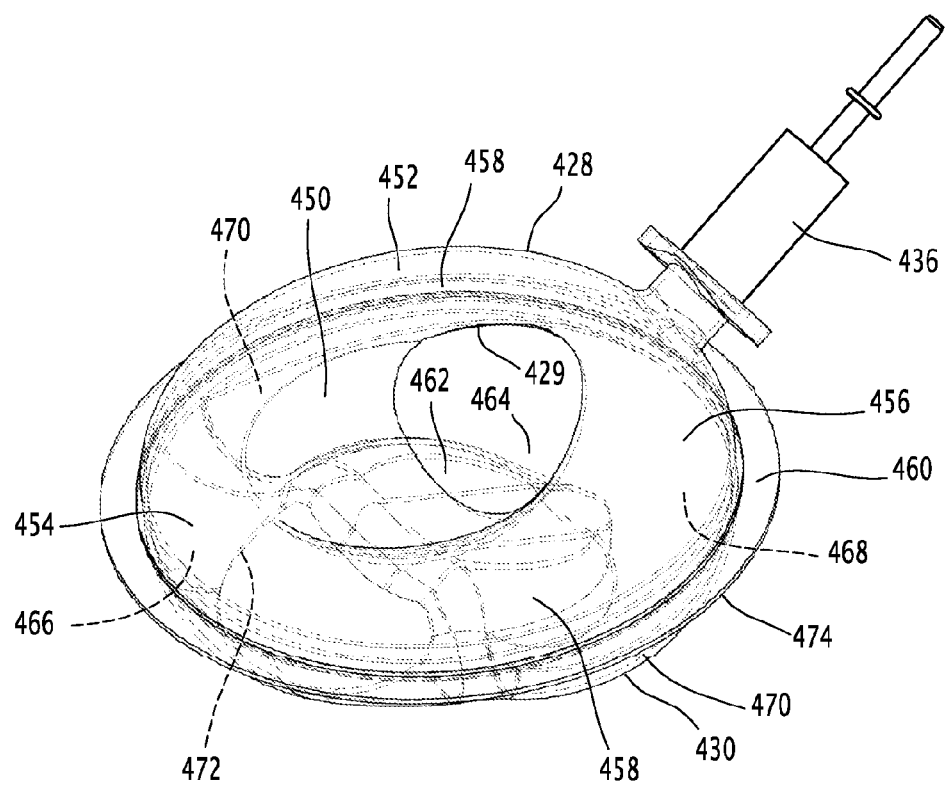
FIG. 13 is a perspective view of the cups of the third embodiment of the exhaust line of FIG. 11.

A third embodiment of the injection section 418 is illustrated in FIGS. 11, 12 (profile views) and 13 (perspective view). The injection section 418 comprises a first cup 428 and a second cup 430.

The outer enclosure 12 of the downstream exhaust gas processing device 6 is fixed sealably to the exhaust gases at the outer enclosure 10 of the upstream exhaust gas processing device 4 via the second cup 430. The two cups 428, 430 are arranged at the junction between the upstream 10 and downstream 12 outer enclosures, the first cup 428 being inside the upstream outer enclosure 10 and the second cup 430 being inside the downstream outer enclosure 12.

The first cup 428 opens toward the downstream face 22 and comprises a rounded wall with no sharp edges. This wall has a hollow central zone 450 facing the upstream face 20 and a peripheral zone 452 protruding toward the upstream face 20 surrounding the hollow central zone 450. The protruding peripheral zone 452 comprises a lower peripheral section 454 and an upper peripheral section 456 opposite one another, the lower peripheral section 454 having a reduced axial height along the central line L1 relative to that of the upper peripheral section 456. The lower 454 and upper 456 peripheral sections are connected to one another by two opposite lateral peripheral sections 458.

The first cup 428 is symmetrical relative to a plane passing through the central line L1 of the injection section 418 and through the reagent injector 436 (FIG. 12).

A large opening 429 is formed in the wall of the first cup 428 between the hollow central zone 450 and the upper peripheral section 456 of the protruding peripheral zone 452. The opening 429 is inclined both relative to the central line L1 and relative to a plane perpendicular to the central line L1. The opening 429 has a substantially rounded triangular shape, one of the apices being located toward the injector 436.

The first cup 428 has a peripheral rim 460 extending the wall of the first cup 428 and extending substantially perpendicular to the central line L1. The peripheral rim 460 of the first cup 428 is fixed sealably to the exhaust gases at the second cup 430, for example by welding.

The second cup 430 is arranged between the first cup 428 and the downstream face 22.

The second cup 430 opens toward the upstream face 20 and comprises a rounded wall with no sharp edges. This wall has a central zone 462 protruding toward the upstream face 20 and a hollow peripheral zone 464 facing the upstream face 20 surrounding the central zone 462. The hollow peripheral zone 464 comprises a lower peripheral section 466 and an upper peripheral section 468 opposite one another, the lower peripheral section 466 having a reduced axial height along the central line L1 relative to that of the upper peripheral section 468. The lower 466 and upper 468 peripheral sections are connected to one another by two opposite lateral peripheral sections 470.

The second cup 430 is symmetrical relative to a plane passing through the central line L1 of the injection section 418 and through the reagent injector 436 (FIG. 12).

An opening 472 is formed in the wall of the second cup 430 between the protruding central zone 462 and the lower peripheral section 466 of the hollow peripheral zone 464. The opening 472 is inclined both relative to the central line L1 and relative to a plane perpendicular to the central line L1. The opening 472 has a rounded crescent moon shape, the large side being located opposite the injector 436.

The opening 429 of the first cup 428 and the opening 472 of the second cup 430 are angularly offset relative to one another around the central line L1 substantially by 180°.

According to one alternative, a second opening is provided in the wall of the first cup 428 between the hollow central zone 450 and the lower peripheral section 454 of the protruding peripheral zone 452, opposite the injector 436 and substantially at the opening 472 of the second cup 430, so as to short-circuit the opening 429 so that part of the gases reaches the opening 472 directly without passing through the circulation channel, thereby decreasing the back pressure.

The second cup 430 has a peripheral rim 474 extending the wall of the second cup 430 and extending substantially perpendicular to the central line L1. The peripheral rim 474 of the second cup 430 is fixed sealably to the exhaust gases at the upstream 10 and downstream 12 outer enclosures as well as at the peripheral rim 460 of the first cup 428, for example by welding.

Assembled, the two cups 428, 430 assume a "doughnut" shape and define two semi-annular conduits between them, going from the opening 429 of the first cup 428 to the opening 472 of the second cup 430.

The reagent injector 436 is provided to inject into the two semi-annular conduits delimited by the two cups 428, 430. To that end, it is fixed on the upper peripheral section 456 of the peripheral zone 452 of the first cup 428, near the opening 429. The injector 436 is oriented substantially at 45° relative to the central line L1 so that the jet is oriented toward the protruding central zone 462 of the second cup 430.

According to one alternative, the injector 436 is oriented so that the injection direction is perpendicular to the two semi-annular conduits.

According to another alternative, the injector 436 is oriented so that the injection direction is parallel to the tangent to the two semi-annular conduits, thereby making it possible to obtain a more compact injection section 418.

The operation of the exhaust line according to the third embodiment described above will now be explained in detail, in light of FIGS. 11 and 12, in which the exhaust gas flow is illustrated by arrows.

As before, the exhaust gases arrive on the first cup 428. The gases are collected by the first cup 428 after having passed through the upstream block 14.

The exhaust gases then penetrate the circulation channel through the opening 429 (FIG. 11).

At the inlet of the circulation channel, the urea is injected and is converted into ammonia during the passage of the exhaust gases in the circulation channel.

Due to the orientation of the injector 436, the gas flow is distributed between the two semi-annular conduits.

A first part of the gas flow thus uses one of the semi-annular conduits and flows along that conduit following a helical movement around the central line of said conduit up to the opening 472. The rounded shape of the two cups 428, 430 initiates the rotary movement of said first part of the gas flow, which performs at least one complete revolution, or up to four complete revolutions around the central line, in a counter-clockwise direction in FIG. 12.

During that time, a second part of the gas flow uses the other of the semi-annular conduits and flows along that conduit following a helical movement around the central line of said conduit up to the opening 472. The rounded shape of the two cups 428, 430 initiates the rotary movement of said second part of the gas flow, which performs at least one complete revolution, or up to four complete revolutions around the central line, in a clockwise direction in FIG. 12.

Once the gases have passed through the opening 472, they will pass through the downstream block 16.

Furthermore, in the same way as in the preceding cases, a mixer may be integrated inside the circulation channel and/or part of the walls of the circulation channel may comprise a wire mesh in order to ensure optimal homogenization of the gases and the urea and/or ammonia.

The advantage of this embodiment is that it allows excellent mixing of the gas and the urea and/or ammonia.

The exhaust line according to the invention has the advantage of reducing the distance between the two faces of successive blocks while preserving a sufficient path length for the gases to ensure the conversion of the urea into ammonia. The path is long enough for the reaction converting the urea, injected into the exhaust gas, into ammonia to be complete, but also for the final exhaust gas/ammonia mixture to be as homogenous as possible.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An automobile exhaust line comprising:
upstream and downstream blocks for processing exhaust gases flowing in the exhaust line, the upstream and downstream blocks being arranged in series in the exhaust line;
an injection section arranged between an upstream face defined by the upstream block and a downstream face defined by the downstream block and including a circulation channel for exhaust gas flow extending from the upstream face to the downstream face, the circulation channel including a central line having a determined length between the upstream and downstream faces, the injection section including a reagent injector mounted on the injection section and capable of injecting a reagent into the injection section;
the injection section comprises at least a first cup arranged inside the circulation channel in the path of the exhaust gas flow such that an average path of exhaust gas jets is higher by at least 20% in relation to the determined length;
wherein the injection section comprises a second cup arranged inside the circulation channel between the upstream face and the first cup; and
wherein the injection of the reagent is done between the first cup and the second cup.

2. The exhaust line according to claim 1, wherein the determined length is substantially comprised between 40 and 140 mm.

3. The exhaust line according to claim 1, wherein a bottom of the first cup winds in a spiral around central line of the injection section.

4. The exhaust line according to claim 3, wherein the bottom of the first cup winds in a spiral around the central line of the injection section, performing three quarters of a revolution.

5. The exhaust line according to claim 3, wherein the first cup has an opening at an end of the spiral furthest from the upstream face.

6. The exhaust line according to claim 3, wherein the first cup has a spoiler at an end of the spiral furthest from the upstream face.

7. The exhaust line according to claim 6, wherein the spoiler extends the bottom of the first cup toward an upstream face and toward the outside of the spiral.

8. The exhaust line according to claim 1, wherein the second cup has a bottom wound in a spiral around the central line of the injection section.

9. The exhaust line according to claim 8, wherein the second cup has an opening at an end of the spiral furthest from the upstream face.

10. The exhaust line according to claim 8, wherein the second cup has an opening at an end of the spiral closest to the upstream face.

11. The exhaust line according to claim 1, wherein the first and second cups define a spiral-shaped conduit between them, starting from an opening of the second cup and going to an opening of the first cup, extending over at least 180°, and having a straight section substantially greater than 2300 mm$^2$.

12. The exhaust line according to claim 1, wherein the first cup includes a rounded wall having a central zone protruding toward the upstream face and a hollow peripheral zone facing the upstream face surrounding the central zone, an opening being formed in the wall of the first cup between the central zone and the hollow peripheral zone.

13. The exhaust line according to claim 12, wherein the second cup comprises a rounded wall having a hollow central zone facing the upstream face and a peripheral zone protruding toward the upstream face surrounding the hollow central zone, an opening being formed in the wall of the second cup between the hollow central zone and the peripheral zone.

14. The exhaust line according to claim 13, wherein the first and second cups are shaped to impart a helical movement to the exhaust gases from the opening of the second cup to the opening of the first cup.

15. The exhaust line according to claim 1, wherein an opening of the first cup and an opening of the second cup are angularly offset relative to one another around the central line.

16. The exhaust line according to claim 1, wherein the second cup has perforations with a diameter substantially equal to 5 mm or an opening.

17. The exhaust line according to claim 1, wherein the first cup comprises a wire mesh layer over at least part of a surface of the first cup.

18. The exhaust line according to claim 1, wherein the reagent injector is oriented so that an injection direction is perpendicular to the injection section.

19. The exhaust line according to claim 1, wherein the reagent injector is oriented so that an injection direction is parallel to a tangent to the injection section.

* * * * *